April 10, 1945. J. E. SMITH 2,373,425
RAILWAY BRAKE EQUIPMENT
Filed July 18, 1942 2 Sheets-Sheet 2
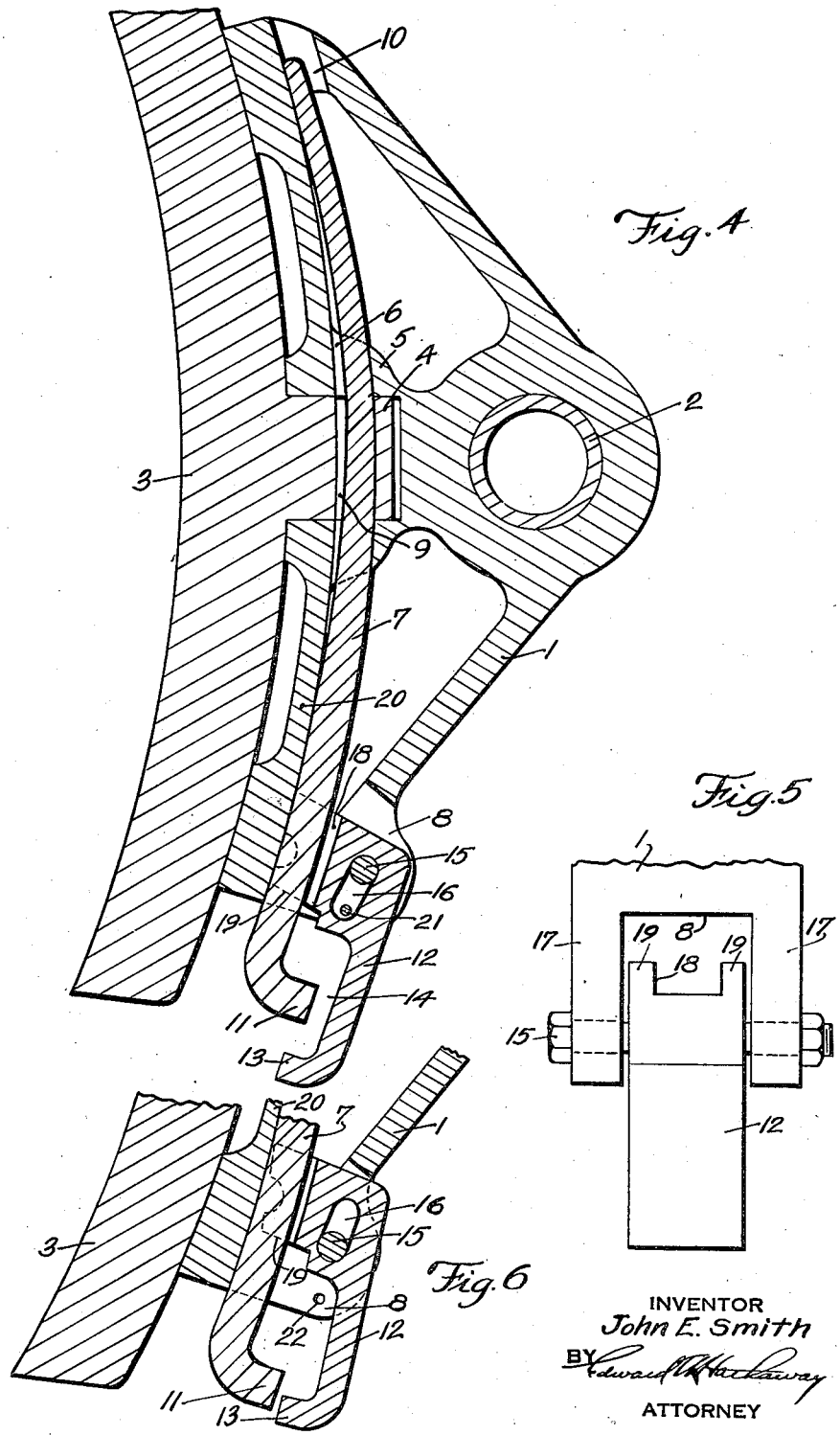
INVENTOR
John E. Smith
BY Edward R. Hathaway
ATTORNEY Patented Apr. 10, 1945

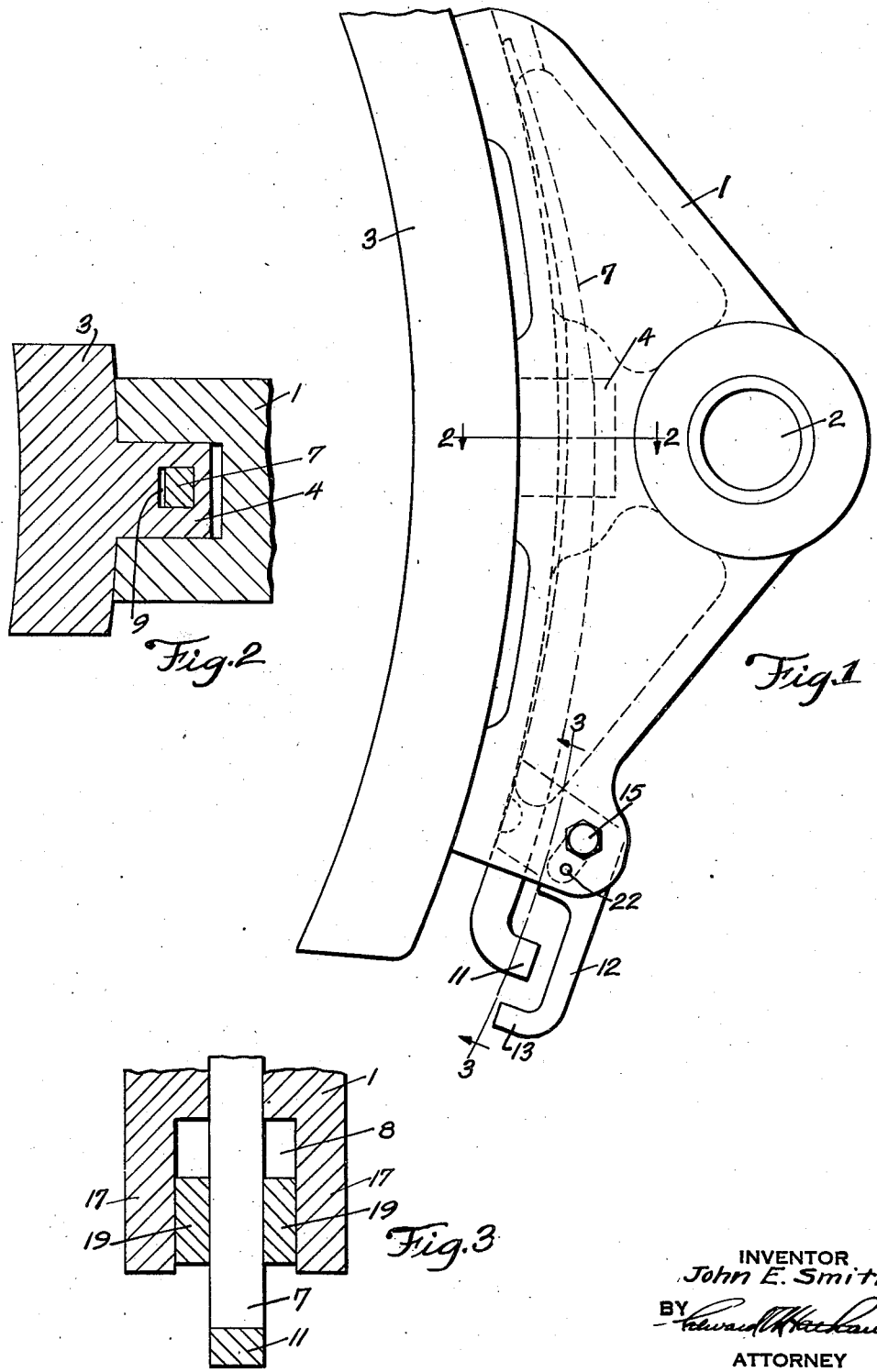

2,373,425

UNITED STATES PATENT OFFICE 2,373,425

RAILWAY BRAKE EQUIPMENT

John E. Smith, Springfield, Pa., assignor to The Baldwin Locomotive Works, a corporation of Pennsylvania Application July 18, 1942, Serial No. 451,387

4 Claims. (Cl. 188—243)

This invention relates generally to railway brake head and brake shoe equipment and more particularly to mechanism for removably securing a brake shoe key in position.

It is customary to removably lock a brake shoe in a brake head by the use of a key that is normally lifted upwardly to release the brake shoe. Because the key must be lifted in order to disconnect the brake shoe, it is seen that gravity is always operating to maintain the key in its operative position thereby avoiding the danger of dropping out due to vibration or other forces. However, this type of key by reason of its upward removal is not well adapted for use in certain types of locomotives wherein extremely limited space is available for such movement. While various arrangements have been suggested whereby makeshift upward movement might be employed as well as arrangements for allowing downward removal of the locking key, yet all of these attempts have been seriously deficient in requiring special keys or of involving the danger of accidental displacement of the keys with consequent loss of the brake shoe.

It is an object of my invention to provide improved key locking means that is compact and rugged and relatively simple in construction, operation and maintenance and is adapted to allow a locking key to be inserted and removed from the under side of the brake shoe head in a direct and expeditious manner and yet be positively prevented from accidental release.

Other objects and advantages will be more apparent to those skilled in the art from the following description of the accompanying drawings in which:

Fig. 1 is a side elevation of a brake head and shoe employing my improved key retainer;

Fig. 2 is a horizontal section taken on the line 2—2 of Fig. 1;

Fig. 3 is a section taken substantially on the line 3—3 of Fig. 1;

Fig. 4 is a view similar to Fig. 1 but showing the parts in section;

Fig. 5 is a rear elevational view of my improved key retainer; and

Fig. 6 is a fragmentary sectional view showing my improved key retainer in its upper key releasing position.

In the particular embodiment of the invention shown herein for purposes of illustrating one specific form among possible others that the invention might take in practice, I employ a well-known standard type brake shoe head 1 pivoted upon a suitable brake rigging shaft 2 to be swung toward or away from a wheel to apply or release a brake shoe 3. The brake shoe is of any standard type having, as shown in Fig. 4, a tongue 4 insertable into a suitable recess within the concave face of the brake shoe head, the recess being formed in an enlarged boss 5 through which extends a vertical key slot 6. To lock the shoe in position a customary form of tapered spring-like flat key 7 is inserted upwardly through a bifurcated lower end 8 of the brake head and thence through an opening 9 in brake shoe tongue 4 and terminating in an upper casing 10. The lower end of the key is turned laterally at 11.

My improved key retainer prevents accidental downward displacement of the key and yet allows the same to be easily and expeditiously removed. To accomplish this I provide a key retainer 12 of substantially elongated form terminating in a lateral lip 13 to form a recess 14 in which turned end 11 is adapted to extend when in its locked position. The retainer 12 is of sufficient width to provide adequate engagement of the key in the event of accidental downward displacement thereof, the retainer being supported in the bifurcated end 8 of the brake head 1. To support the retainer a transverse pin 15 extends through an elongated slot 16 in retainer 12 and is permanently secured in sides 17 of the bifurcated end 8. A vertical slot 18 is formed in the upper inner side of retainer 12 to form two legs 19 adapted to bear upon the inner side of a brake head shoe 20 thereby to prevent rotation of retainer 12 when in its locking position shown in Fig. 4. To positively hold the retainer in position a cotter pin or wire 21 may be inserted through suitable transverse openings 22, Fig. 6, in the side wall 17, this wire being located to pass through the lower end of the slot 16.

In operation, if it is desired to release brake key 7, the cotter pin 21 is first removed whereupon the operator moves retainer 12 upwardly to the position shown in Fig. 6. Due to the inclination of slot 16 relative to the direction of movement of key 7 it is seen that the retainer will move at such an angle less than 90° to the direction of movement of the key that lip 13 will clear turned end 11 whereupon key 7 may be moved downwardly to release brake shoe head 3. To lock the key in position it is only necessary to drop retainer 12 to the position shown in Fig. 4 and insert the wire or cotter pin 21. The inclined slot 16 cooperates with legs 19 and brake head 20 to allow interlocking element 13 to be biased under the action of gravity toward its interlocking position. The contact between legs 19 and brake head 20 prevents element 12, 13 from swinging in a counterclockwise direction while the inclined slot 16 directs movement of element 13 to its interlocking position during the above mentioned counterclockwise restraint. The biased action to an interlocking position provides a high degree of safety in that accidental removal of holding pin 21 will still be accompanied by the tendency of the interlocking element 12 and 13 to stay in its interlocking position.

From the foregoing disclosure it is seen that I have provided an extremely simple and economical means for locking a downwardly removable brake shoe key in position with maximum safety and for unlocking the same in an easy and expeditious manner, all with minimum working parts that are easily adapted to be made in a compact and rugged manner.

It will of course be understood that various changes in details of construction and arrangement of parts may be made by those skilled in the art without departing from the spirit of the invention as set forth in the appended claims.

I claim:

1. In combination, a brake head having a brake shoe and a downwardly removable locking key to hold the brake shoe in position on the brake head, releasable interlocking elements carried respectively on said brake head and on said key for restricting removal of the latter, and means for slidably supporting one of said elements so that upon sliding movement thereof said interlocking action is rendered inoperative thereby to allow removal of said key, said slidable supporting means having provision whereby the sliding supporting relation is maintained while the key is being removed.

2. In combination, a brake head having a brake shoe and removable locking key to hold the brake shoe in position on the brake head, overlapping interlocking elements respectively supported on said key and brake head, and means whereby one of said elements is permanently but movably connected to the brake head and is adapted to have movement along substantially straight lines diverging less than 90 degrees relative to the direction of movement of said key thereby to move one of the elements away from said overlapping relation, and means for preventing said relative movement between said elements.

3. In combination, a brake head having a brake shoe and a downwardly removable locking key to hold the brake shoe in position on the brake head, cooperating overlapping elements for preventing displacement of said key, and means for moving one of said elements out of its cooperating relation to allow displacement of said key including a pin and slot connection between said latter cooperating element and said brake head, said slot being elongated and inclined relative to the direction of movement of said key.

4. In combination, a brake head having a brake shoe and provided with a downwardly extending opening through which a locking key is initially received by upward movement of the locking key to hold the brake shoe in position on the brake head and through which the key is removed downwardly to unlock the brake shoe, interlocking elements carried respectively on said brake head and on said key for restricting removal of the latter, and means for movably supporting one of said elements by said brake head so as to maintain a positive connection therewith and to cause said movable element to be biased toward an interlocking position under the force of gravity.

JOHN E. SMITH.